United States Patent [19]

Abe

[11] Patent Number: 4,514,136
[45] Date of Patent: Apr. 30, 1985

[54] PIVOT ANGLE ADJUSTING MEANS FOR THE ARM OF A MATERIAL HANDLING DEVICE

[75] Inventor: Masatoshi Abe, Yokohama, Japan

[73] Assignee: Okamura Corporation, Yokohama, Japan

[21] Appl. No.: 379,151

[22] Filed: May 17, 1982

[30] Foreign Application Priority Data

Dec. 25, 1981 [JP] Japan ............................ 56-197453[U]

[51] Int. Cl.³ .............................................. B65G 47/90
[52] U.S. Cl. .................................. 414/744 A; 901/13; 901/22
[58] Field of Search .......................... 414/744 A, 750; 116/297; 901/13, 14, 22

[56] References Cited

U.S. PATENT DOCUMENTS

| 3,682,327 | 8/1972 | Winne | 414/744 A |
|---|---|---|---|
| 3,885,678 | 5/1975 | Borg et al. | 901/14 |
| 4,015,721 | 4/1977 | Scheler | 414/744 A |
| 4,113,115 | 9/1978 | Yoshio | 414/744 A |
| 4,264,266 | 4/1981 | Trechsel | 901/17 |
| 4,293,268 | 11/1981 | Mink | 414/744 A |
| 4,299,532 | 11/1981 | Bouwmeester | 414/750 |
| 4,319,864 | 3/1982 | Kanfeldt | 414/750 |
| 4,409,792 | 10/1983 | Nowak | 414/750 |

FOREIGN PATENT DOCUMENTS

| 975287 | 11/1961 | Fed. Rep. of Germany | 116/297 |
|---|---|---|---|
| 2815298 | 10/1979 | Fed. Rep. of Germany | 92/121 |

OTHER PUBLICATIONS

E. L. Rudisill, "Guide to Limit Switches", 11/12/62, pp. 83-101, Product Engineering.

*Primary Examiner*—Sheldon J. Richter
*Assistant Examiner*—Randolph A. Smith
*Attorney, Agent, or Firm*—Lackenbach Siegel Marzullo Presta & Aronson

[57] ABSTRACT

Pivot angle adjusting means for the arm of a material handling device such as industrial robots are disclosed. An arm connected to a rotary shaft via a mount is pivotably mounted to a support. A cylindrical vane chamber having a rotary vane therein is mounted to the support, wherein the rotary vane secured to the rotary shaft is pivoted by a fluid supplied to the cylindrical vane chamber. A stopper is mounted to the rotary shaft and its pivot angle is detected by a pair of sensors mounted to the support. A stop is mounted to the support and is movable at a certain distance in the direction of the movement of the stopper. The stop can be placed in the locus of the movement of the stopper so as to stop the stopper at a certain intermediate point within the pivot movement of the stopper in its clockwise and counter-clockwise movements, thereby stopping the arm at the intermediate point. Further, a pair of stoppers may be mounted to the rotary shaft via a spur wheel at a certain angle and actuate the sensors, and another stopper may be mounted to the rotary shaft via another spur wheel and is stopped by the stop at the intermediate point.

5 Claims, 8 Drawing Figures

PIVOT ANGLE ADJUSTING MEANS FOR THE ARM OF A MATERIAL HANDLING DEVICE

BACKGROUND OF THE INVENTION

The present invention relates to pivot angle adjusting means for the arm of a material handling device such as industrial robots.

In the prior art, as shown in FIG. 1, an arm C of an industrial robot, or the like, is adapted to be pivoted through a certain angle by stopping a stopper D attached to the arm C by means of limit switches or oil dampers A. When the arm C is stopped at an intermediate point within said predetermined angle, a stop B such as a limit switch or oil damper is selectively placed in the locus of the pivot movement of the arm C by moving up the stop B therein. In this embodiment, however, since the stop B has a certain thickness, the stop position of the arm C is different when it is moved in the clockwise or the counterclockwise direction, which is rather inconvenient for an accurate positioning of a small piece in the material handling.

SUMMARY OF THE INVENTION

It is an object of the present invention to provide pivot angle adjusting means for the arm of a material handling device, free from the inconveniences, which enables free adjustment of the pivot angle of the arm and an accurate positioning of even a small item, and which is simple and reliable in operation.

According to the present invention there is provided pivot angle adjusting means for the arm of a material handling device, comprising (a) an arm mount for holding an arm, (b) a support which supports the arm mount, (c) a rotary shaft which is rotatably mounted to the support therethrough, (d) a cylindrical vane chamber having a rotary vane, mounted to the support, in which the rotary vane secured to the rotary shaft is adapted to be pivoted by a fluid supplied to the cylindrical vane chamber, (e) a stopper mounted to the rotary shaft, (f) a pair of sensors which are mounted to the support, and which are actuated by the stopper and detect the pivot angle of the rotary shaft, and (g) a stop which is mounted to the support and is movable at a certain distance in the direction of the movement of the stopper, and which can be placed in the locus of the movement of the stopper so as to stop the stopper at a certain intermediate point within the pivot movement of the stopper in its clockwise and counterclockwise movements.

BRIEF DESCRIPTION OF DRAWINGS

In order that the present invention may be better understood, preferred embodiments thereof will be described with reference to the accompanying drawings, in which.

DESCRIPTION OF THE PREFERRED EMBODIMENTS

Figure 1:
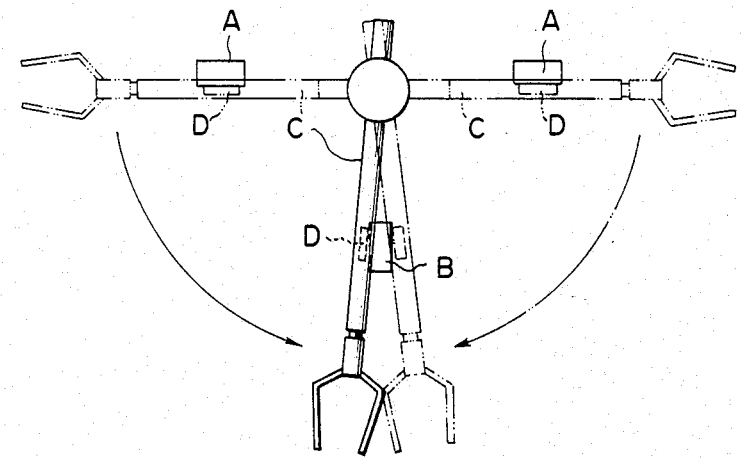
FIG. 1 is a schematic view of a conventional pivot angle adjusting means for the arm of a material handling device.
Figure 2:
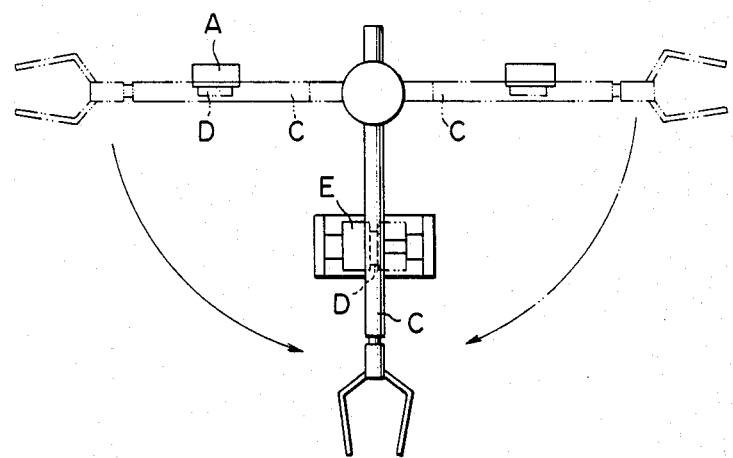
FIG. 2 is a schematic view of pivot angle adjusting means for the arm of a material handling device made according to the present invention.
Figure 3:
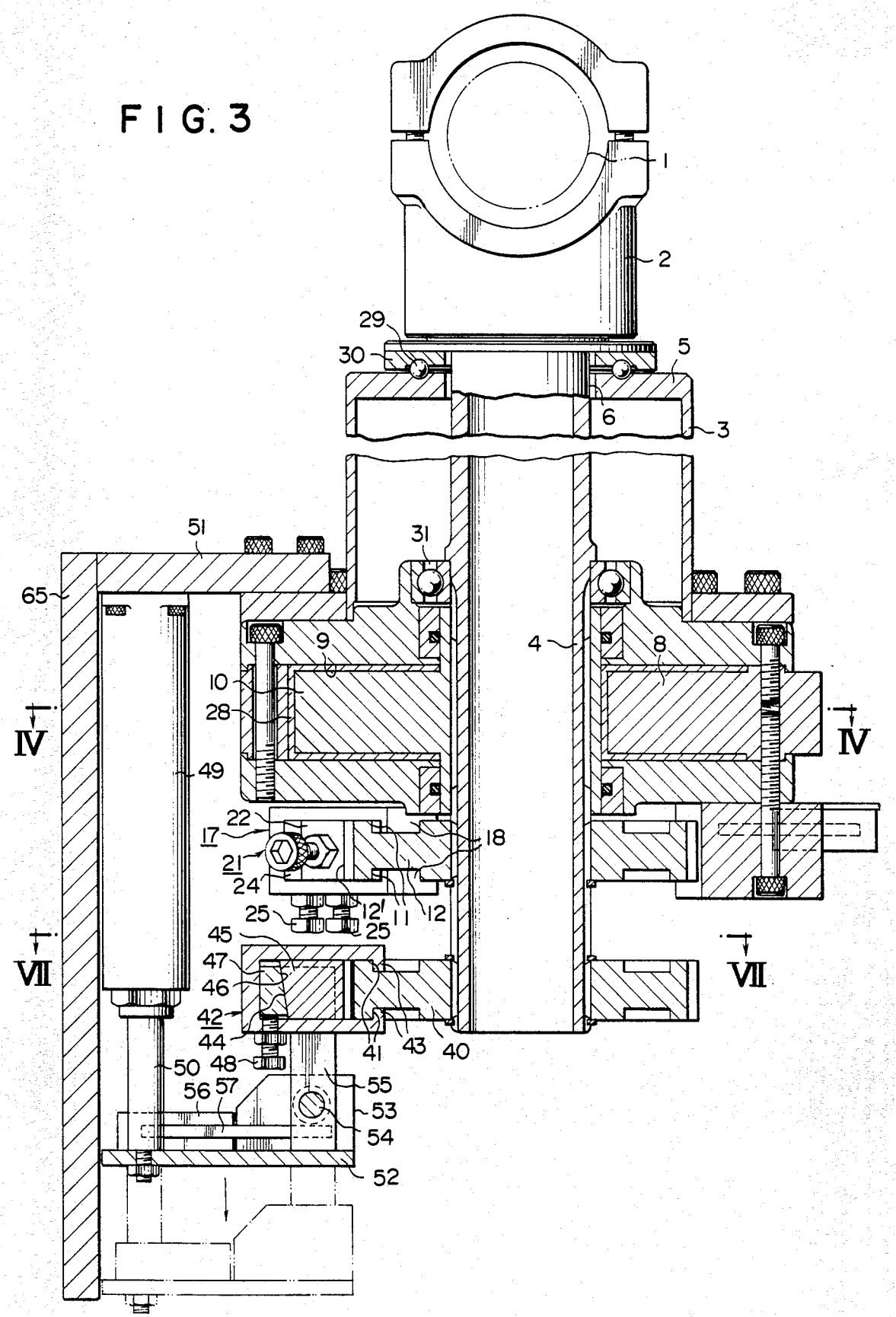
FIG. 3 is a fragmentary sectional view elevation of the pivot angle adjusting means for the arm of the material handling device shown in FIG. 2.
Figure 4:
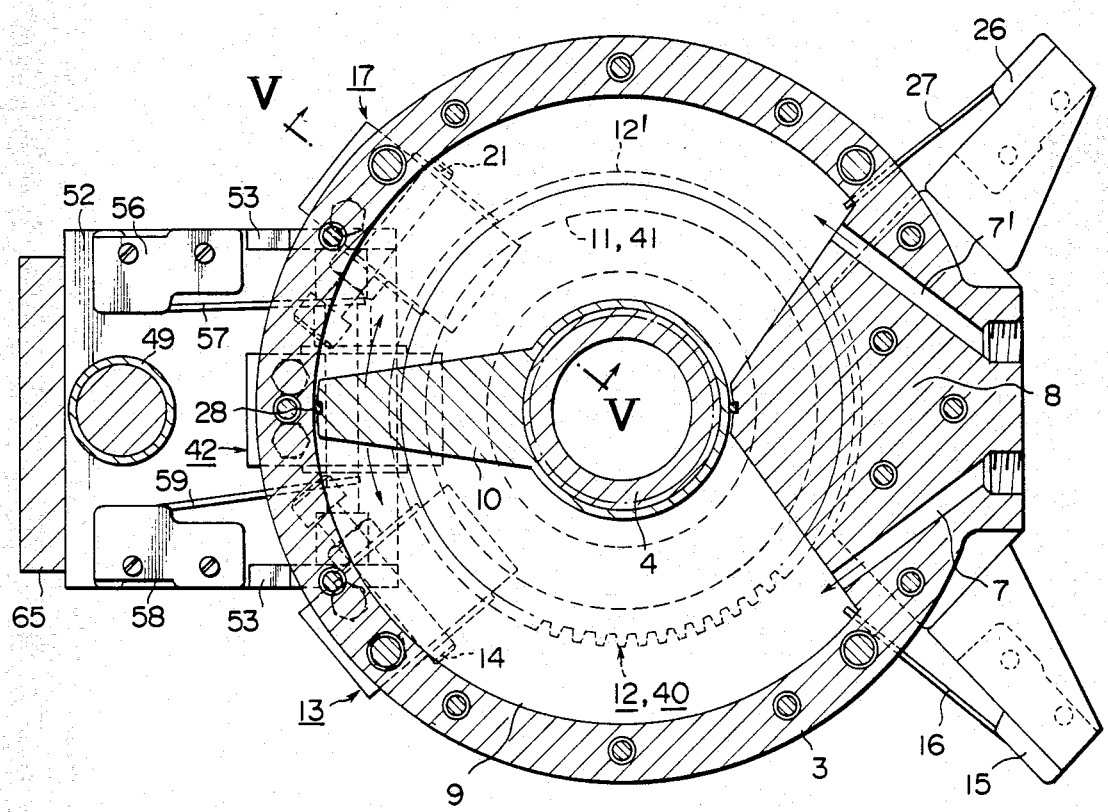
FIG. 4 is a transverse sectional view, taken along the line IV—IV of FIG. 3.
Figure 5:
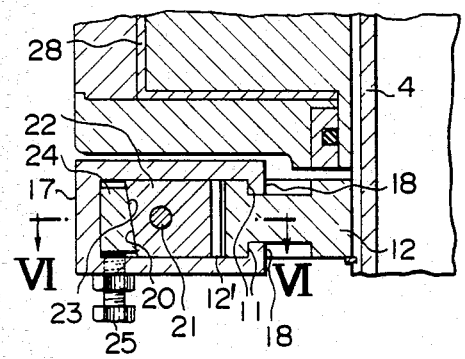
FIG. 5 is a longitudinal sectional view, taken along the line V—V of FIG. 4.
Figure 6:
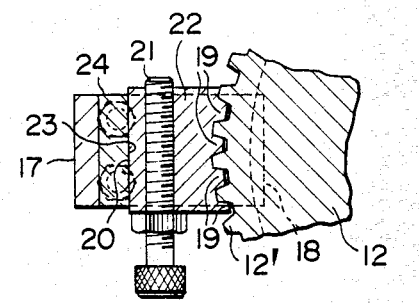
FIG. 6 is a transverse sectional view, taken along the line VI—VI of FIG. 5.
Figure 7:
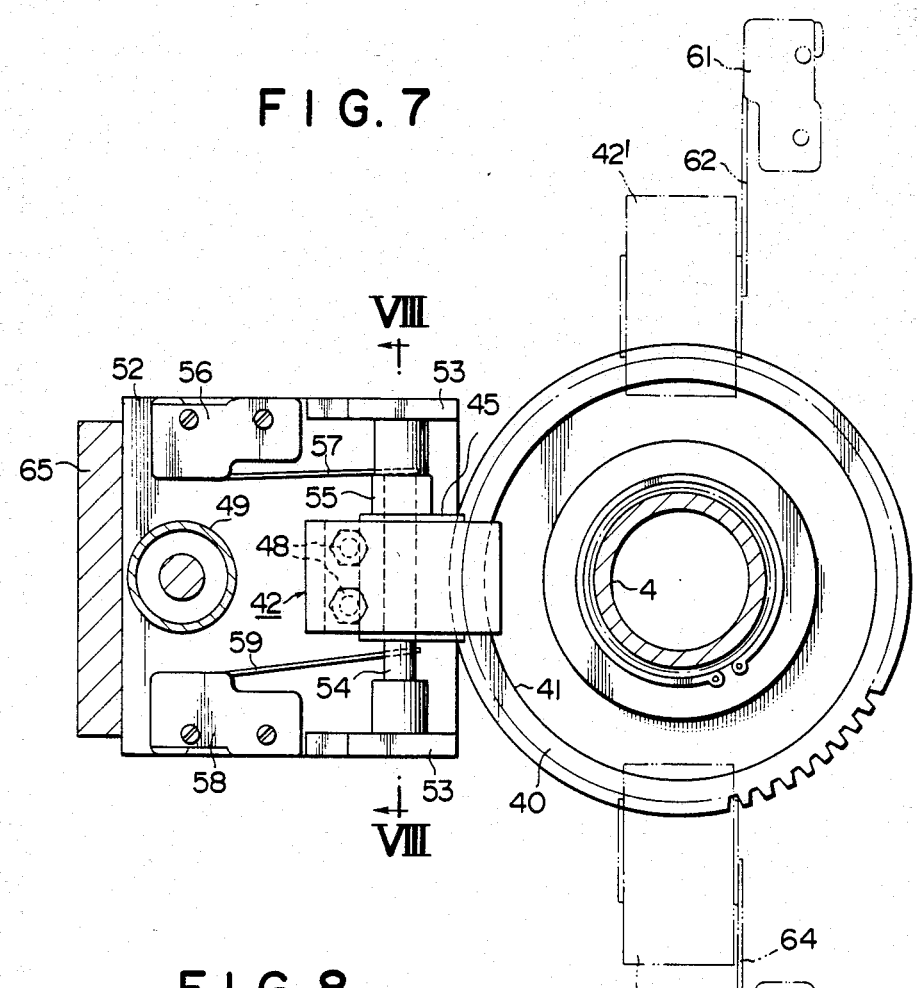
FIG. 7 is a transverse sectional view, taken along the line VII—VII of FIG. 3.
Figure 8:
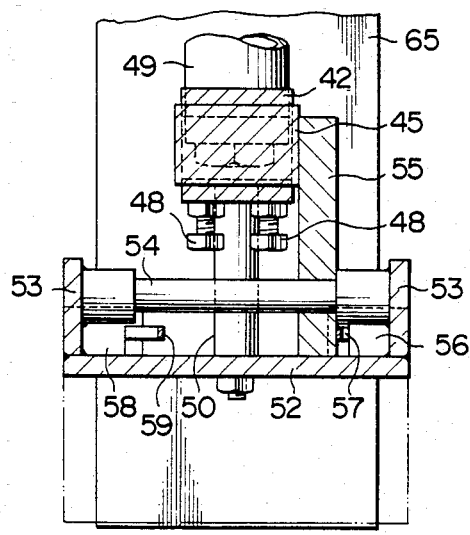
FIG. 8 is a longitudinal sectional view, taken along the line VIII—VIII of FIG. 7.

Referring to the drawings there is shown schematically in FIG. 2 pivot angle adjusting means for the arm of a material handling device made according to the present invention.

In this embodiment, the arm C is pivoted through the predetermined angle defined by the limit switches A, and can be stopped at the predetermined intermediate point by a stop E which is movable at a certain distance in the right and the left hand side directions so that the arm C may be stopped at the same position when it is pivoted in the clockwise and the counterclockwise directions.

There are shown preferred embodiments of pivot angle adjusting means of arms for material handling in FIGS. 3-8, in detail.

An arm 1 is held by an arm mount 2 which is positioned on a support 3. A rotary shaft 4 is vertically connected to the bottom element 30 or plate of the arm mount 2, and extends downwardly through a top central opening 6 of the support 3; and is suitably rotatably supported by a first bearing means 29 and a second bearing means 31. A cylindrical vane chamber 9 whose inner space is partitioned by a fan-shaped wall 8 having fluid paths 7 and 7' therein, is mounted to the lower part of the support 3. A rotary vane 10 secured to the rotary shaft 4 is adapted to slide or pivot around the rotary shaft 4 in contact with the inner surface of the cylindrical vane chamber 9, by means of a U-shaped seal 28 suitably mounted in a groove in the vane 10 clockwise or counterclockwise, by supplying a fluid such as oil, water or the like, from the fluid path 7 or 7' to the cylindrical vane chamber 9.

A spur wheel 12 having flanges 11 in its upper and lower peripheries is mounted to the lower part of the rotary shaft 4 under the cylindrical vane chamber 9. A stopper 13 having an adjusting screw bolt 14 across it is mounted to the flanges 11 of the spur wheel 12, and the end of the adjusting screw bolt 14 is to be contacted with an actuating lead 16 of a limit switch 15 which is mounted to the support 3, when the rotary shaft 4 is pivoted.

Another stopper 17 having the same construction as the stopper 13 is mounted to the flanges 11 of the spur wheel 12. The stopper 17 comprises a mount piece 18 having substantially a U-shaped cross section, its ends being bent upwards and downwards so as to engage with the inner peripheries of the flanges 11, a toothed piece 22 having teeth 19 to be engaged with the teeth 12' of the spur wheel 12 in its inner end and a tapered outer end surface 20 facing a lower skew or slant, an adjusting screw bolt 21 fitted into a horizontal tapped hole of the toothed piece 22 therethrough, a wedge piece 24, positioned between the toothed piece 22 and the outer end of the mount piece 18, having a tapered inner end surface 23 which faces an upper skew or slant and contacts with the tapered outer end surface 20 of the toothed piece 22, and screw bolts 25 mounted to the lower part of the mount piece 18, push up the wedge piece 24 from the bottom.

When the fluid is supplied to the vane chamber 9 via the fluid path 7 or 7', the rotary vane 10 is pivoted clockwise or counterclockwise together with the rotary shaft 4 until the stopper 17 or 13 butts the actuating arms 27 or 16 of the limit switch 26 or 15 to actuate it. Then, the limit switch 26 or 15 stops the supply of the fluid to the vane chamber 9 through the fluid path 7 or 7', thereby stopping the movement of the rotary shaft 4. Therefore, the movable pivot angle of the rotary shaft 4 is restricted by the two positions of the stoppers 17 and 13. In other words, the movable pivot angle of the rotary shaft 4 is changed by varying the positions of the stopper 17 and/or 13.

The change of the position of the stopper 17 is performed by releasing the wedge piece 24 and changing the engage position of the teeth 19 of the toothed piece 22 with respect to the teeth 12' of the wheel 12. The finer pivot angle adjustment of the rotary shaft 4 than one pitch of the tooth 12' of the wheel 12 is carried out by adjusting the adjusting screw bolts 14 and 21 of the stoppers 13 and 17.

Another spur wheel 40 having flanges 41 in its upper and lower peripheries, which has the same construction as the wheel 12 described above, is secured to the lowermost end of the rotary shaft 4. A stopper 42 having the same construction as the stopper 13 or 17 except lacking the adjusting screw bolt 21, i.e. numerals 43, 44, 45, 46, 47 and 48 correspond to the mount piece 18, the tapered outer end surface 20, the toothed piece 22, the tapered inner end surface 23, the wedge piece 24 and the screw bolts 25, is mounted to the spur wheel 40 in the same manner as described above.

An air cylinder 49 having an actuating rod 50 therein is vertically mounted to the support 3 via a bracket 51. A base plate 52 is mounted to the lower free end of the rod 50, and hence the base plate 52 is movable up and down by the air cylinder 49. A pair of parallel support plates 53 are disposed upright on the base plate 52 at a certain interval or predetermined spacing. A horizontal shaft 54 is suspended by and between the support plates 53, and a stop plate 55 is slidably mounted on the horizontal shaft 54. The stop plate 55 is moved on and along the horizontal shaft at a distance equal to the width of the stopper 42 and double as thick as the stop plate 55 so that the stopper 42 may be stopped at the same point when it is pivoted clockwise and counterclockwise.

The movement of the stop plate 55 is detected at the ends by a pair of limit switches 56 and 58 having actuating arms 57 and 59, respectively, which are arranged on the base plate 52 beside the support plates 53.

The stop plate 55 is placed in the locus of the movement of the stopper 42 by moving up the base plate 52 so that the rotary shaft 4 may be stopped at a certain intermediate point within the movable pivot angle of the rotary shaft 4. When the stop plate 55 is not used, it is lowered out of the place.

In the embodiment described above, the movable pivot angle of the rotary shaft 4 and the arm 1 which is pivoted thereby, is determined by the stoppers 13 and 17 and the limit switches 15 and 26, and the rotary shaft 4 or the arm 1 is stopped at the intermediate point by the stopper 42. However, the movable pivot angle of the rotary shaft 4 can be determined by using the stopper 42, as shown by imaginary lines in FIG. 7. That is, a pair of limit switches 61 and 63 having respective actuating arms 62 and 64 are so mounted to the support 3 that the two limit switches 61 and 63 may be actuated by the stopper 42 when it is pivoted through the desired pivot angle, as shown by numerals 42' and 42''. In this embodiment, the wheel 12 and the stoppers 13 and 17 and the limit switches 15 and 26 can be omitted. A stop plate 65 for preventing the base plate 52 from rotation around the rod 50 and is mounted to the bracket 51.

Although the present invention has been described in some detail by way of illustration and example for purposes of clarity, it will, of course, be understood that various changes and modifications thereof may be made in the form, details, and arrangements of the parts without departing from the scope of the present invention.

What is claimed is:

1. Pivot angle adjusting means for the arm of a material handling device comprising:
   (a) an arm mount for holding an arm;
   (b) a support which supports the arm mount;
   (c) a rotary shaft which is rotatably mounted to the support,
   (d) a cylindrical vane chamber having a rotary vane, mounted to the support, in which the rotary vane secured to the rotary shaft is adapted to be pivoted by a fluid supplied to the cylindrical vane chamber;
   (e) a stopper mounted by means of a spur wheel having upper and lower peripheries, to the rotary shaft below said rotary vane;
   (f) a pair of sensors mounted to the support, and which are actuated by a pair of further stoppers for detecting the pivot angle of the rotary shaft;
   (g) a stop having a U-shaped mounting piece being mounted to the support and being movable a certain distance in the direction of the movement of the stopper, and said stop being adapted to be placed in the locus of the movement of the stopper so as to stop the stopper at a certain intermediate point which is the same point within the pivot movement of the stopper when the stopper is pivoted clockwise or counterclockwise; said stop being adapted to be movable a distance equal to the sum of the thickness of the stopper and double the thickness of said stop; and
   (h) and wherein said stopper comprises a mount piece of substantially U-shaped cross section, and having end bent upwardly and downwardly so as to engage in a periphery of flanges formed in said upper and lower peripheries of said spur wheel, a toothed piece having teeth engageable with teeth of said spur wheel in its inner end and having a tapered outer end surface facing a lower skew or slant, a wedge piece positioned between said toothed piece and the outer end of said mount piece, having a tapered inner end surface which faces an upper skew or slant and contacts with said tapered outer end surface of said toothed piece, and adjustable screw means mounted to the lower part of said mount piece, for pushing up on the bottom of said wedge piece.

2. Pivot angle adjusting means as defined in claim 1, further comprising a pair of sensors which detect the stop positions of the stop in the clockwise and the counterclockwise movements.

3. Pivot angle adjusting means as defined in claims 1 or 2, wherein the sensor is a limit switch.

4. Pivot angle adjusting means as defined in claims 1, or 2, wherein a pair of stoppers are mounted to the rotary shaft by means of a spur wheel at a certain angle, each stopper actuating a respective sensor.

5. Pivot angle adjusting means as defined in claim 1, wherein the sensor is a limit switch.

* * * * *